(12) United States Patent
Chauvel et al.

(10) Patent No.: US 8,516,502 B2
(45) Date of Patent: Aug. 20, 2013

(54) PERFORMING JAVA INTERRUPT WITH TWO PROGRAM COUNTERS

(75) Inventors: Gerard Chauvel, Antibes (FR); Gilbert Cabillic, Brece (FR); Jean-Philippe Lesot, Etrelles (FR)

(73) Assignee: Texas Instruments Incorporated, Dallas, TX (US)

( * ) Notice: Subject to any disclaimer, the term of this patent is extended or adjusted under 35 U.S.C. 154(b) by 1656 days.

(21) Appl. No.: 11/741,237

(22) Filed: Apr. 27, 2007

(65) Prior Publication Data

US 2008/0134212 A1 Jun. 5, 2008

(30) Foreign Application Priority Data

Dec. 4, 2006 (EP) .................................. 06291876

(51) Int. Cl.
- *G06F 3/00* (2006.01)
- *G06F 9/44* (2006.01)
- *G06F 9/46* (2006.01)
- *G06F 13/00* (2006.01)
- *G06F 9/455* (2006.01)
- *G06F 9/45* (2006.01)

(52) U.S. Cl.
USPC ................ 719/318; 719/320; 718/1; 718/100

(58) Field of Classification Search
None
See application file for complete search history.

(56) References Cited

U.S. PATENT DOCUMENTS

| | | | | |
|---|---|---|---|---|
| 4,297,743 A | * | 10/1981 | Appell et al. | 718/106 |
| 5,317,745 A | * | 5/1994 | Chan | 710/264 |
| 6,092,185 A | * | 7/2000 | Slegel et al. | 712/219 |
| 6,397,379 B1 | * | 5/2002 | Yates et al. | 717/140 |
| 7,114,164 B2 | * | 9/2006 | Smith et al. | 719/318 |
| 7,146,305 B2 | * | 12/2006 | van der Made | 703/22 |
| 7,287,140 B1 | * | 10/2007 | Asanovic et al. | 711/163 |
| 7,373,640 B1 | * | 5/2008 | English et al. | 717/149 |
| 7,743,384 B2 | * | 6/2010 | Cabillic et al. | 718/108 |
| 2002/0016865 A1 | * | 2/2002 | Yanagi et al. | 709/315 |
| 2006/0026322 A1 | * | 2/2006 | Chauvel et al. | 710/260 |
| 2006/0026565 A1 | * | 2/2006 | Cabillic et al. | 717/118 |
| 2006/0282839 A1 | * | 12/2006 | Hankins et al. | 719/318 |

OTHER PUBLICATIONS

Harold S. Stone, Introduction to Computer Architectur,1980, 1975, Science Research Associates, Inc, Second Edition, pp. 167-170.*
Warford, Computer Systmes, 2005, Jones and Bartlett, Third Edition, pp. Cover Page, 11,47, 152-154, 166-168 and 418-420.*
Warford, Computer Systems, 2005, Jones and Bartlett, Third Edition, pp. 46, 48-50.*

* cited by examiner

*Primary Examiner* — H S Sough
*Assistant Examiner* — Craig Dorais
(74) *Attorney, Agent, or Firm* — Lawrence J. Bossuk; W. James Brady; Frederick J. Telecky, Jr.

(57) ABSTRACT

A method and system for performing a Java interrupt. At least some of the illustrative embodiments are methods comprising executing a thread having a context on a stack based on a first program counter, detecting an interrupt while executing the thread (wherein execution of the thread is temporarily suspended), and executing a method portion to handle the interrupt (wherein the method portion is executed on the stack based on the first program counter, and wherein the context during execution of the method portion is the same as during execution of the thread).

3 Claims, 4 Drawing Sheets

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE/ADDRESS INDEX 0 (AI0) |
| R9 | GENERAL PURPOSE/ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE/INDIRECT REGISTER INDEX (IRI) |
| R15 | STATUS AND CONTROL (ST) |

*FIG. 3*

| | 516 |
|---|---|
| 512 — 0 | @ useq it0 handler |
| 512 — 1 | @ useq it1 handler |
| 512 — 2 | @ useq it2 handler |
| 512 — 3 | @ useq it3 handler |
| ⋮ | ⋮ |
| 512 — N | @ useq it handler |

510

PERFORMING JAVA INTERRUPT WITH TWO PROGRAM COUNTERS

CROSS-REFERENCE TO RELATED APPLICATION

The present application claims the benefit of EP Application No. 06291876.8, filed on Dec. 4, 2006, hereby incorporated herein by reference.

BACKGROUND

Java™ is a programming language that, at the source code level, is similar to object oriented programming languages such as C++. Java language source code is compiled into an intermediate representation based on a plurality of "bytecodes" that define specific tasks. In some implementations, the bytecodes are further compiled to machine language for a particular processor. In order to speed the execution of Java language programs, some processors are specifically designed to execute some of the Java bytecodes directly. Many times, a processor that directly executes Java bytecodes is paired with a general purpose processor so as to accelerate Java program execution in a general or special purpose machine.

Interrupts are often used to signify that an event has occurred and that an action should be taken. When a Java processor receives an interrupt, native (non-Java) code instructions are used to handle interrupts. However, native code is not as dense (i.e., compact), stable, secure, suited to low power applications as Java, thus undermining performance of the processor.

SUMMARY

The problems noted above are solved in large part by a method and system for performing a Java interrupt. At least some of the illustrative embodiments are methods comprising executing a thread having a context on a stack using a first program counter, detecting an interrupt while executing the thread (wherein execution of the thread is temporarily suspended), and executing a method portion to handle the interrupt (wherein the method portion is executed on the stack using the first program counter, and wherein the context during execution of the method portion is the same as during execution of the thread).

Other illustrative embodiments are processors comprising fetch logic that retrieves instructions from memory, decode logic coupled to the fetch logic, and a first program counter. The processor executes a thread having a context on a stack using the first program counter and detects an interrupt while executing the thread. Execution of the thread is temporarily suspended and the processor executes a method portion to handle the interrupt (the method portion is executed on the stack using the first program counter, and the context during execution of the method portion is the same as during execution of the thread).

BRIEF DESCRIPTION OF THE DRAWINGS

For a more detailed description of the various embodiments, reference will now be made to the accompanying drawings, wherein:

FIG. 3 shows various registers used in the JSM of FIGS. 1 and 2;

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device, such as a processor. The processor described herein may be particularly suited for executing Java™ Bytecodes, or comparable code. Java is particularly suited for embedded applications and is a relatively "dense" language meaning that, on average, each instruction may perform a large number of functions compared to various other programming languages. The dense nature of Java is of particular benefit for portable, battery-operated devices. The reason, however, for executing Java code is not material to this disclosure or the claims that follow. Further, the various embodiments may be described in the context of Java, but should not be limited to the execution of only Java instructions. The processor described herein may be used in a wide variety of electronic systems (e.g., cell phones).

Figure 1:
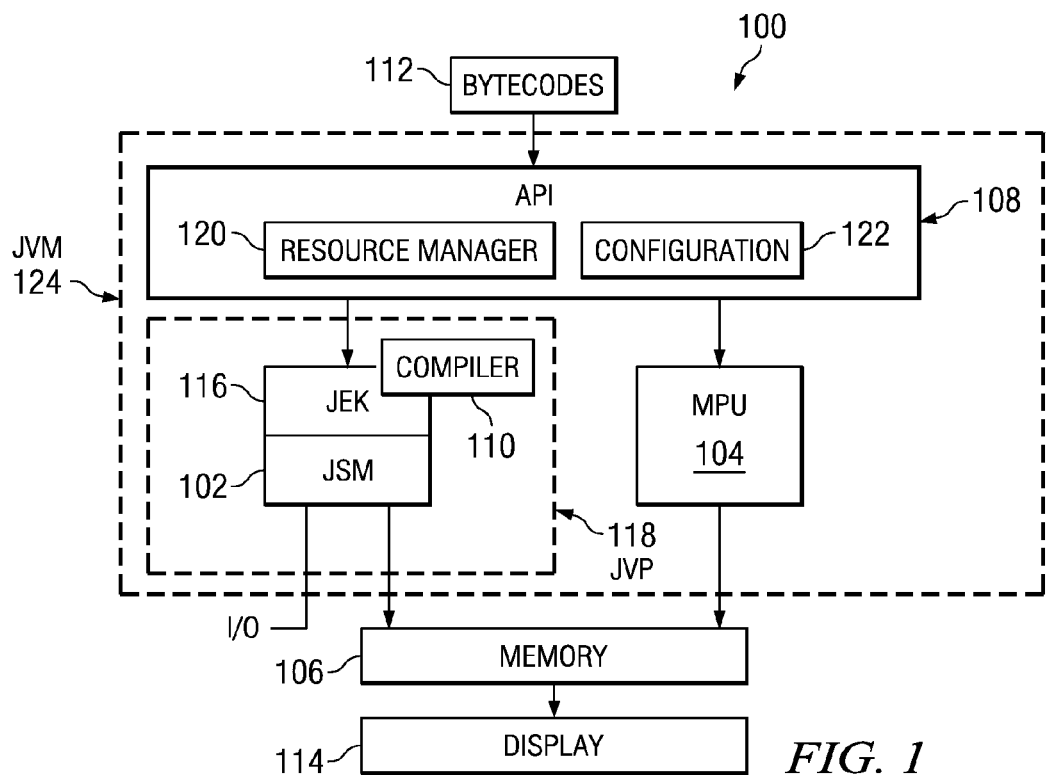
FIG. 1 shows a diagram of a system in accordance with embodiments of the invention comprising a Java Stack Machine ("JSM")

FIG. 1 illustrates a system 100 in accordance with at least some embodiments. In particular, the system 100 comprises at least one processor 102. Processor 102 is referred to for purposes of this disclosure as a Java Stack Machine ("JSM") 102. The JSM 102 is a Java processor that executes Java bytecodes. The JSM 102 comprises an interface to one or more input/output ("I/O") devices such as a keypad to permit a user to control various aspects of the system 100. In addition, data streams may be received from the I/O space into the JSM 102 to be processed by the JSM 102.

Optional processor 104 may be referred to as a Micro-Processor Unit ("MPU"). The MPU 104 is a processor that executes non-Java instructions, and in some embodiments the MPU 104 may also execute Java bytecodes through an interpreter. System 100 may also comprise memory 106 coupled to both the JSM 102 and MPU 104 and thus accessible by both processors. A portion of the memory 106 may be shared by both processors, and if desired, other portions of the memory 106 may be designated as private to one processor or the other. The memory 106 may be further coupled to a display 114.

System 100 also comprises a Java virtual machine (JVM) 124. The JVM 124 may comprise an Application Programming Interface implementation (API) 108 and a Java Virtual Processor (JVP) 118 (discussed more below). The API implementation 108 comprises a resource manager 120 and a configuration 122. The resource manager 120 manages resource sharing between multiple threads and/or applications running on the system 100. The configuration 122 provides applications with an API, which API is used to access base functionalities of the system.

The JVP 118 may comprise a combination of software and hardware. The software may comprise a compiler 110 and a JSM Execution Kernel (JEK) 116. The JEK 116 comprises software that is executable within the JSM 102, such as a class loader, bytecode verifier, garbage collector, and firmware to interpret the bytecodes that are not directly executed on the JSM processor 102. Thus, the hardware of the JVP 118 may comprise the JSM 102. The JVP 118 provides a layer of abstraction between the API 108 and a physical hardware platform (e.g., JSM 102) that executes Java bytecodes. Other components may be present as well.

Java language source code is converted or compiled to a series of bytecodes 112, with each individual one of the bytecodes referred to as an "opcode." Bytecodes 112 may be provided to the JEK 116, possibly compiled by compiler 110, and provided to the JSM 102. When appropriate, the JVP 118 may direct some method execution to the MPU 104.

The MPU 104 executes non-Java instructions. For example, the MPU 104 may host an operating system (O/S) which performs various functions such as system memory management, system task management and most or all other native tasks running on the system, management of the display 114, and receiving input from input devices. Java code, executed on the JVP 118, may be used to perform any one of a variety of applications such as multimedia, games or web based applications in the system 100, while non-Java code, which may comprise the O/S and other native applications, may run on the MPU 104.

Most Java bytecodes perform stack-based operations. For example, an "IADD" (integer add) Java opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses within the JVM or JEK data structure for various verifications (e.g., NULL pointer, array boundaries) are made.

The JSM processor 102 in accordance with some embodiments executes, in addition to the Java bytecodes, a second instruction set other than Java bytecodes. In some exemplary embodiments, the second instruction set may comprise register-based and memory-based operations rather than stack-based operations. This second instruction set complements the Java instruction set and, accordingly, may be referred to as a complementary instruction set architecture ("C-ISA"). By complementary, it is meant that some complex Java bytecodes may be replaced by a "micro-sequence" comprising C-ISA instructions. The execution of Java code may thus be made more efficient and run faster by replacing some opcodes by more efficient micro-sequences of C-ISA instructions. The JSM 102 thus comprises a stack-based architecture for direct execution of Java bytecodes, combined with a register-based architecture for direct execution of memory-based micro-sequences of C-ISA instructions. Because various data structures may be JVM dependent, and thus may change from one JVM implementation to another, the software flexibility of the micro sequence provides a mechanism for various JVM optimizations now known or later developed.

As discussed above, the JVP 118 provides a layer of abstraction between the API 108 and the JSM 102. In particular, the JVP 118 is a virtual hardware platform that is compatible with any Java API, any real hardware/software platform that may comprise a JSM processor, or any JVM implementation. In some exemplary embodiments, the JVP 118 comprises a JEK core that has an execution engine, a memory management component, and a compiler. The execution engine may comprise a Bytecode engine, a class loader, a notification manager, and an external method interface. The memory management component may comprise a memory allocator, an object mapper for physically constrained objects, a garbage collector, a memory defragmentor, and a swapper. The compiler may comprise a dynamic compiler and provide code buffer management. The JEK core may also comprise firmware to facilitate the execution of Java Bytecodes on the JSM processor.

The JVP 118 also provides the API 108 with methods to create software class loaders. A class loader loads classes used by an application at runtime. Other hardware components of the hardware platform or software components are each virtualized within the JEK 116 as a Java Virtual Device (JVD) that communicates with the JEK core. A JVD comprises some combination of fields, methods, and notifications. The fields may comprise standard Java fields or may be mapped to a predefined or constrained physical memory space, wherein the constraint may be due to hardware or software. The fields may also comprise a map to indirect memories. The methods may comprise standard bytecodes or may comprises JSM native code, hardware instructions, or may use any kind of native interface such as a Java Native Interface (JNI) or a KVM Native Interface (KNI). The notifications may be initiated by an event, for example, a hardware interrupt, or from software. Additionally, the JEK core manages native interface links and the notification mechanism provides a way to implement flexible monitoring.

Figure 2:
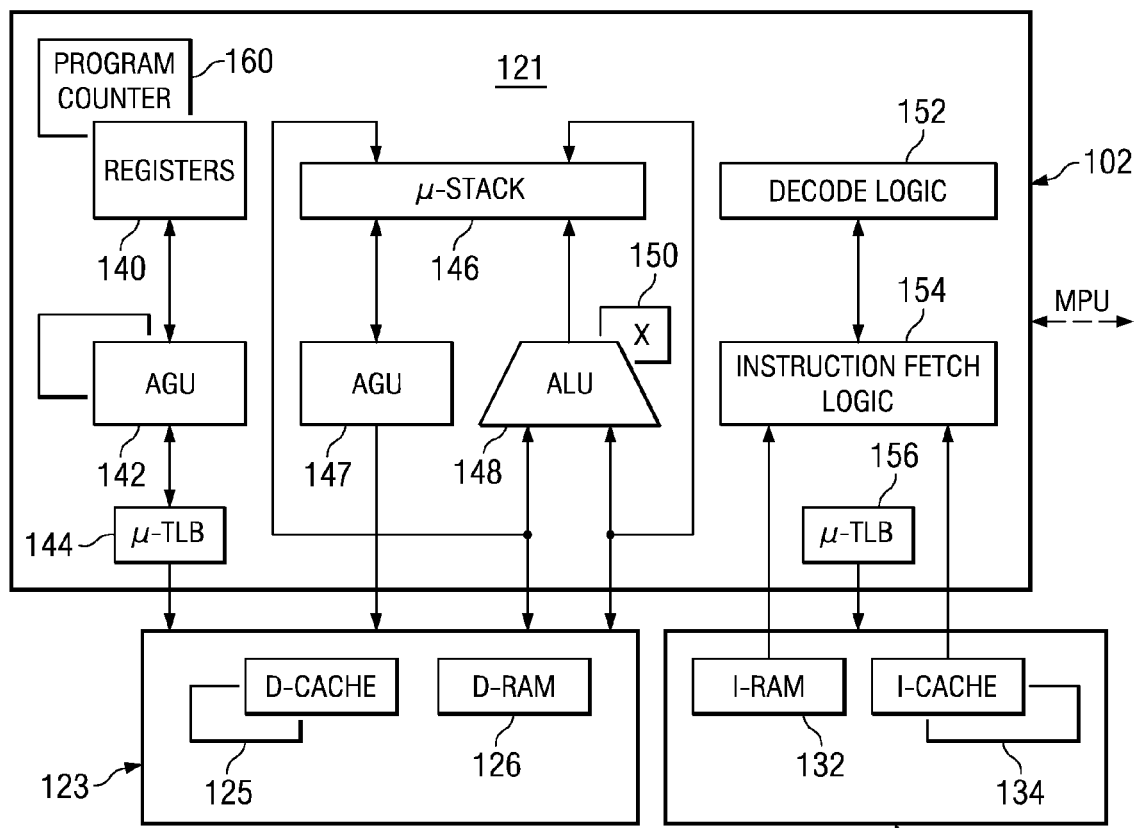
FIG. 2 shows a block diagram of the JSM of FIG. 1.

FIG. 2 shows an illustrative block diagram of the JSM 102 that executes the JEK 116 software, as described above. As shown, the JSM comprises a core 121 coupled to data storage 123 and instruction storage 130. The components of the core 121 may comprise a plurality of registers 140 such as a program counter 160, address generation units ("AGUs") 142 and 147, micro translation lookaside buffers (micro TLBs) 144 and 156, a multi entry micro stack 146, an arithmetic logic unit ("ALU") 148, a multiplier 150, decode logic 152, and instruction fetch logic 154. Data pointed to by operands of opcodes may be retrieved from data storage 123, from the micro stack 146, or from the registers 140 and processed by the ALU 148. Instructions pointed to by the program counter 160 may be fetched from instruction storage 130 by fetch logic 154 and decoded by decode logic 152. The AGUs 142 may be used to calculate addresses based, at least in part, on data contained in the registers 140. AGU 147 couples to the micro stack 146 and may manage overflow and underflow conditions in the micro stack 146. The micro-TLBs 144 and 156 perform the function of a cache for the address translation and memory protection information bits that may be under the control of the operating system running on the MPU 104.

Java bytecodes may pop data from and push data onto the micro-stack 146, which micro-stack 146 comprises a plurality of gates in the core 121 of the JSM 102. The micro-stack 146 comprises the top x entries of a larger stack (i.e., an overall stack) that is implemented in data storage 123. Although the value of x may be vary in different embodiments, in accordance with at least some embodiments the size x of the micro-stack may be the top eight entries in the larger, memory-based stack. By implementing the micro-stack 146 hardware in the core 121 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches instructions from instruction storage 130, which instructions may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java mode in which Java bytecodes may be decoded, and a C-ISA mode in which micro-sequences of C-ISA instructions may be decoded.

The data storage 123 comprises data cache ("D-cache") 125 and data random access memory ("D-RAM") 126. The stack (excluding the micro stack 146), arrays and non-critical data may be stored in the D-cache 125, while local variables and data may be stored in D-RAM 126. The instruction storage 130 may comprise instruction RAM ("I-RAM") 132 and instruction cache ("I-Cache") 134. The I-RAM 132 may be used for opcodes or micro-sequences, and the I-Cache 134 may be used to store other types of Java bytecode and mixed Java/C-ISA instructions.

Referring now to FIG. 3, the registers 140 (of FIG. 2) may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes, and R12 storing a micro-program counter ("micro-PC") for executing micro sequences. In addition to use as a GP register, register R5 may be used to store the base address of a portion of memory in which Java local variables may be stored when used by a Java method. The top of the micro stack 146 can be referenced by the values in registers R6 and R7, and the top of the micro stack may have a matching address in external memory pointed to by register R6. The values contained in the micro-stack are the latest updated values, while their corresponding values in external memory may or may not be up to date. Register R7 provides the data value stored at the top of the micro stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. At least one bit (called the "Micro-Sequence-Active" bit, not specifically shown) in status register R15 is used to indicate whether the JSM 102 is executing by way of a micro sequence. This bit controls, in particular, which program counter is used (R4 (PC) or R12 (micro PC)) to fetch the next instruction.

In accordance with embodiments of the invention, interrupts asserted to the JVP 118 are handled, at least in part, by way of Java-based programs. Java is dense (i.e., compact), stable, secure, suited to low power applications, and allows for high level programming of interrupts. However, rather than executing Java code within an interrupt by way of context switching (which suffers from high latency and relies on an operating system scheduler for management of the execution flow of an interrupt service routine (i.e., interrupt handler)), in embodiments of the present invention an interrupt is handled with a small amount of C-ISA code and a set of Java-based code, wherein the Java-based code is executed without making a context switch, and without relying on an operating system scheduler to manage the execution flow of the interrupt. More particularly, the various embodiments rely on executing Java-based interrupt handling within the same "context" as executing when the interrupt arrives.

A thread is defined as an independent flow of control or stream of execution of an application, and multiple threads are used to give the appearance of concurrently performing different tasks within the same processor such as the JVP 118. A thread comprises a "context" (e.g., a program counter, a register set, and a stack having a stack base address) and code (e.g., Java code). Each thread has its own context and code. For Java threads, the stack comprises an operand stack and local variables of Java methods executed by the thread. In particular, each thread is associated to and is executed on a different stack within the overall stack, wherein each stack comprises a range of memory addresses such as within the data storage 123, and wherein each stack has a different stack base address. Different threads may occupy contiguous or non-contiguous locations in memory. In addition, the range of memory addresses for a given stack corresponding to a given thread does not overlap any other range of memory addresses for any other stack corresponding to any other thread. When a thread is executed, its corresponding stack is accessed based on the thread's context. The thread context comprises a Stack Pointer (SP) value (R6) which comprises an address of the top of a stack, a Top of Stack (ToS) value (R7) which contains the value of the top of the stack, and a Program Counter (PC) value (R4) which comprises an address of a thread instruction that is executed. When a thread is just beginning its execution, the PC value may comprise an address of the first thread instruction. In some cases, an executing thread may be interrupted by another thread, pre-empted by a higher priority thread, or stopped for some other reason as determined by the operating system scheduler. In a "context switch", the context of the originally executing thread (all registers including the SP value and PC value) is pushed onto its corresponding stack (having a particular stack base address), and the context of a new thread is popped from its corresponding stack (having a different stack base address) and all registers, including the SP value and PC value, of the new thread are loaded into the appropriate registers for execution of the new thread. The storing of a thread context corresponding to a thread having a particular stack base address and the subsequent loading of a different thread context (i.e., different register values) corresponding to a thread having a different stack base address, as described above, is what constitutes the context switch. In some instances, a context switch may be performed as part of a scheduled sequence of operations as determined by the operating system scheduler. According to the hardware, additional operations may be called for to save or restore the context of a thread when making a thread switch (e.g., cleaning caches or cleaning the micro-stack).

Threads executed within the JVP 118 comprise one or more methods, and a "method" comprises executable instructions and performs one or more functions. Other terms for "method" may include subroutines, code segments, and functions, and the term should not be used to narrow the scope of this disclosure. One or more methods and their associated local variables may be executed in one thread and the same or different methods may be executed in a different thread.

Each stack within the overall stack as described above comprises a stack of "stack frames", and a new stack frame is created upon invocation of a method within the same thread (i.e., within the same context). A "stack frame" comprises an operand stack and local variables that are used to execute the invoked method. The stack frame at the top of the stack is the "active stack frame". The active stack frame is the stack frame used by the currently executing method. Upon invocation of a method within the same thread, a newly created stack frame is pushed onto the stack, thus becoming the active stack frame. The operand stack and local variables of the previously active stack frame are stored beneath the newly created stack frame. When the method finishes executing, the active stack frame is popped from the stack, and the stack frame beneath becomes the active stack frame. Thus, the active stack frame (i.e., the method that was executing) prior to invocation of the new method once again becomes the active stack frame, and the previously executing method continues. For purposes of this disclosure, the process of pushing a new stack frame onto the stack and popping it from the stack after execution of its associated method is not considered a context switch inasmuch the current execution stack does not change (i.e., the stack base address remains the same). While the SP value, the ToS value, and the PC value may change during method execution and pushing/popping, the constant stack base address value signifies that the same stack address space is being addressed and thus a context switch has not been completed. In addition, the pushing and popping of stack frames on a stack and subsequent method execution does not involve use of the operating system scheduler since execution is confined to one context (i.e., one thread).

Figures 4, 5:
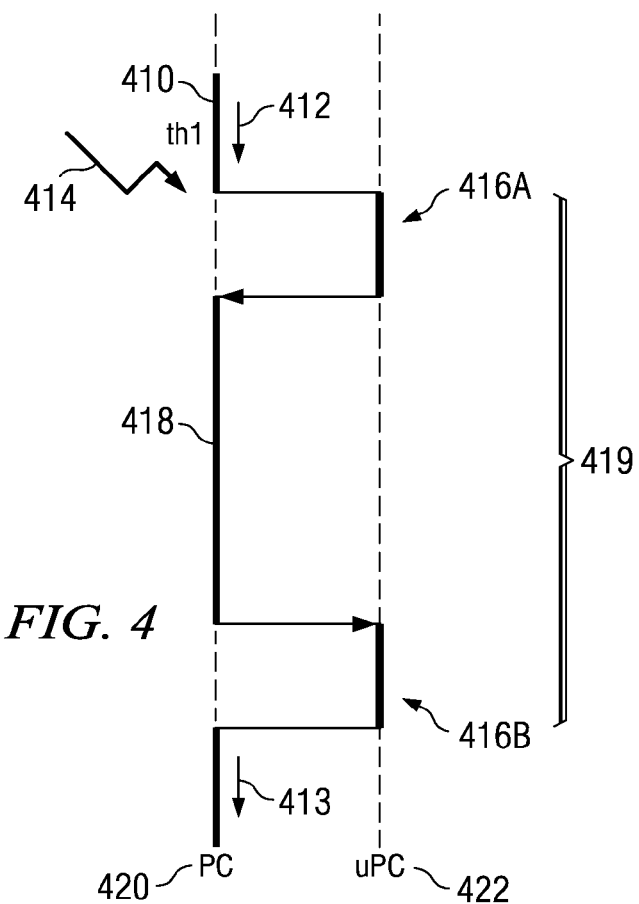
FIG. 4 shows a method in accordance with embodiments of the invention.
FIG. 5 shows a table in accordance with embodiments of the invention.

FIG. 4 illustrates embodiments of the present invention for handling an interrupt by execution of Java bytecodes inside the interrupt execution flow without making a context switch. Java code 410 executing in the direction indicated by arrow 412 executes as a thread (thread 1 labeled as "th1") according to a program counter. Thread 1 executes a stream of bytecodes with PC 420 as active program counter. While thread 1 is executing, an interrupt 414 is detected which temporarily suspends the execution of thread 1 and pushes a current JSM context (i.e., the PC and/or micro-PC value and the registers) onto the stack, and switches program execution flow to an Interrupt Service Routine (ISR) 419, which comprises both a micro-sequence handler 416 (i.e., a set of C-ISA instructions) and a Java portion 418 which comprises at least one Java method. Moreover, the micro-sequence handler 416 comprises a first micro-sequence portion 416A that executes prior to the Java portion 418 and a second micro-sequence portion 416B that executes after the Java portion 418. Upon transferring program execution flow to the ISR 419, micro-PC 422 temporarily becomes the active program counter during execution of the first micro-sequence portion 416A. At this point, the JSM 102 begins fetching and decoding the instructions of the first micro-sequence portion 416A. The switch from PC 420 to the micro-PC 422 is effective immediately upon occurrence of an interrupt, thereby reducing the latency.

A unique micro-sequence handler may be provided for every distinct interrupt, and the association between interrupts and handlers is defined by way of a table 510 as illustrated in FIG. 5. The table 510 may be implemented in the decode logic 152, as separate logic in the JSM 102, or as software within the JEK 116. Furthermore, in some embodiments, the JEK 116 may dynamically overwrite associations stored in the table 510 with new associations, thus allowing any of the available micro-sequence handlers to be triggered by any interrupt that is encountered. The table 510 comprises a plurality of entries 512, one entry for each interrupt. For example, if there are a total of 10 different types of interrupts, the table 510 comprises at least 10 entries. Each entry 512 comprises at least one field 516. Field 516 may contain a reference to a micro-sequence handler triggered upon receipt of a corresponding interrupt. For example, an interrupt with an index value equal to 3 ("interrupt level 3") is associated to the micro-sequence handler having an address stored in the table 510 at offset 3 "@useq it3 handler". Thus, "@useq it3 handler" is the micro-sequence handler for the interrupt level 3.

The field 516 may comprise a full starting address in instruction storage 130 of the micro-sequence handler or a part of the starting address that can be concatenated with a base address that may be programmable in the JSM. In the former case, the field 516 may provide sufficient address bits to access the full memory space in which are stored the micro-sequence code. In the latter case, a register within the JSM registers 140, or within a JSM configuration register, is programmed to hold the base address and the field 516 may supply only the offset to access the start of the micro-sequence handler. Additionally, the JSM internal registers 140, and any other registers accessible by the JVP 118 or the MPU 104, may be modified by the JVM. This latter addressing technique may be used to reduce the number of bits needed within the field 516.

Returning to FIG. 4, the first micro-sequence portion 416A makes an invocation which serves to create a new Java stack frame within the JSM 102 that is used to execute the Java portion 418 which handles the interrupt 414. As previously discussed, the stack frame comprises information regarding the Java portion 418 as called for by the JVM 124 such as local variables, an operand stack, a reference to a Java object which comprises a Java method of the Java portion 418 which is to be executed, or other such information. The size of the stack frame invoked may vary based on the Java method of the Java portion 418 to be executed. The newly invoked stack frame is then pushed onto the stack (e.g., the micro-stack 146) for execution of the Java portion 418. The first micro-sequence portion 416A then transfers execution of the interrupt to the Java portion 418, wherein such a transfer consists in making the PC the active program counter and referencing the first instruction of the Java portion 418. Thereafter, the Java portion 418 executes, utilizing Java bytecodes and Java object references (rather than pointers) which increases the Java platform stability and security. The Java portion 418 ends with a return bytecode that is used to transfer execution to the second micro-sequence portion 416B as illustrated in FIG. 4. Thus, the micro-PC once again becomes the active program counter. The second micro-sequence portion 416B serves to pop (i.e., delete) the stack frame that was used for execution of the Java portion 418. The second micro-sequence portion 416B then executes a return from interrupt, which may comprise a predetermined instruction called "RtuS" (return from micro-sequence) that indicates the end of the sequence. This C-ISA instruction causes a switch from the micro-PC (register R12) to the PC (register R4) upon completion of the micro-sequence and pops the JSM context (i.e., the PC and/or micro-PC value and the registers) that was pushed onto the stack when entering the ISR 419. Thereafter execution within the JSM 102 resumes with the currently running thread as indicated by arrow 413, which in this example is thread 1. Specifically, thread 1 is resumed based on the context that was pushed onto the stack prior to execution of the ISR 419. That is, the previously active stack frame (i.e., prior to the invocation of the micro-sequence portion 416A that created the new stack frame) once again becomes the active stack frame, and the previously executing method (e.g., a method of thread 1) continues. Specifically, the PC points to the instruction following the instruction at which the interrupt was triggered. In some embodiments, the PC may have been incremented or offset by some predetermined value during execution of the interrupt so that the PC may point to an alternative instruction for subsequent decoding and execution.

Since thread 1 and the Java portion 418 execute within a single stack corresponding to thread 1, there is no context switch. Although the SP value and PC value may change during method execution and during the pushing and popping of the stack frame of the Java portion 418, the value of the stack base address remains constant, signifying that the same stack address space is being addressed and thus a context switch has not been completed. In addition, since execution is confined to one thread, the operating system scheduler is not used. Thus, a Java method may be directly entered and executed as part of an efficient interrupt handling routine within the interrupt execution flow of the processor that uses a small amount of C-ISA native code. Though Java has been used to describe embodiments of the invention, the same methods can be applied to any other high level runtime as well.

Figure 6:
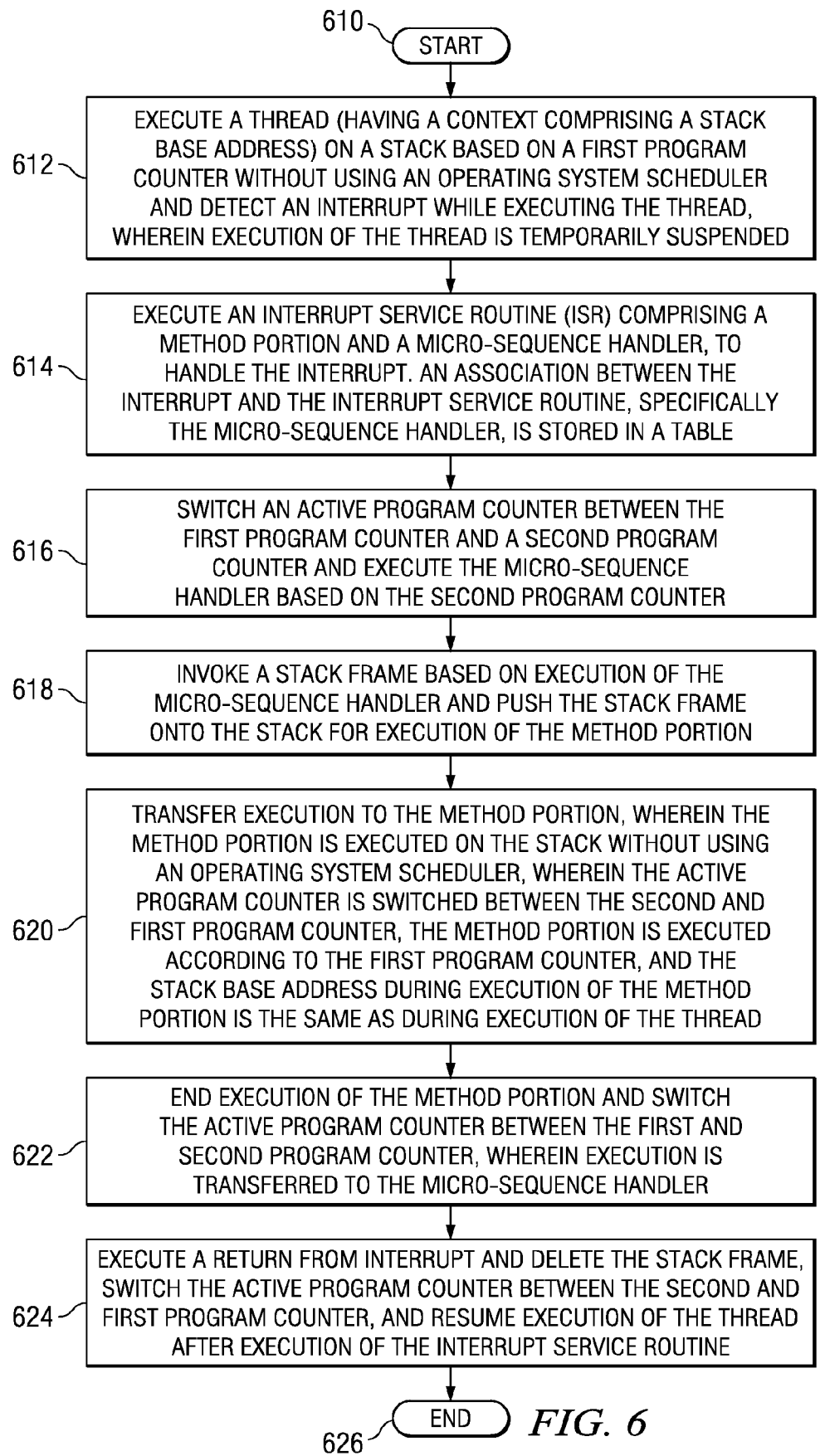
FIG. 6 shows a method in accordance with embodiments of the invention.

FIG. 6 illustrates a method (e.g., software) in accordance with some embodiments. In particular, the process starts (block 610) and proceeds to executing a thread (having a context comprising a stack base address) on a stack based on a first program counter (block 612). The thread is executed without using an operating system scheduler. Initially, the first program counter is the active program counter. An interrupt is detected while the thread is executing, and execution of the thread is temporarily suspended. An Interrupt Service Routine (ISR), comprising a method portion and a micro-sequence handler, is executed to handle the interrupt (block 614). In particular, the method portion is executed to handle the interrupt. An association between the interrupt and the ISR is stored in a table. In some embodiments, the table stores an association between the interrupt and the micro-sequence handler. The active program counter is switched between the first program counter and a second program counter and the micro-sequence handler is executed based on the second program counter (block 616). The micro-sequence handler invokes a stack frame and pushes the stack frame onto the stack for execution of the method portion (block 618). The method portion comprises at least one Java method. The micro-sequence handler then transfers execution to the method portion (block 620). The active program counter is switched between the second and first program counter, and the method portion is executed. The context during execution of the method portion is the same as during execution of the thread. In particular, the stack base address during execution of the method portion is the same as during execution of the thread. The method portion is also executed without using the operating system scheduler. Execution of the method ends with a return bytecode and the active program counter is then switched between the first and second program counter wherein execution is transferred to the micro-sequence handler (block 622). The micro-sequence handler executes a return from interrupt (block 624). The micro-sequence handler serves to delete the stack frame. The active program counter is then switched between the second and first program counter, and execution of the thread is resumed. In some embodiments, the first program counter is the PC and the second program counter is the micro-PC. The process then ends (block 626).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A process of handling an interrupt by execution of Java bytecodes inside an interrupt execution flow without making a context switch, comprising:
   A. executing Java code as a thread 1 according to a first stack frame and a first program counter;
   B. while thread 1 is executing, detecting an interrupt, suspending the execution of thread 1, pushing the first stack frame onto a stack, and switching program execution flow to an Interrupt Service Routine, the Interrupt Service Routine including both a micro-sequence handler and a Java portion, the Java portion including at least one Java method, the micro-sequence handler including a first micro-sequence portion that executes prior to the Java portion and a second micro-sequence portion that executes after the Java portion;
   C. upon transferring program execution flow to the Interrupt Service Routine, making a second program counter an active program counter during execution of the first micro-sequence portion and fetching and decoding the instructions of the first micro-sequence portion, the switch from the first program counter to the second program counter being effective immediately upon occurrence of the interrupt, thereby reducing latency;
   D. making an invocation in the first micro-sequence portion to create a second stack frame for executing the Java portion to handle the interrupt, pushing the second stack frame onto the stack for execution of the Java portion, and transferring execution of the interrupt to the Java portion, wherein the transfer makes the first program counter the active program counter and references the first instruction of the Java portion;
   E. executing the Java portion, utilizing Java bytecodes and Java object references, which increases the Java platform stability and security, and ending the Java portion with a return bytecode transferring execution to the second micro-sequence portion and the second program counter; and
   F. executing the second micro-sequence portion to delete the second stack frame that was used for execution of the Java portion, executing a return from interrupt to switch from the second program counter to the first program counter, popping the first stack frame on the stack, and continuing execution of thread 1.

2. The process of claim 1 including executing thread 1 with a stream of bytecodes and the first program counter.

3. The process of claim 1 including implementing a unique micro-sequence handler for every distinct interrupt accessed from an address in a table.

* * * * *